US007830346B2

United States Patent
Lai et al.

(10) Patent No.: US 7,830,346 B2
(45) Date of Patent: *Nov. 9, 2010

(54) LIQUID CRYSTAL DISPLAY PANEL WITH COLOR WASHOUT IMPROVEMENT BY SCANNING LINE COUPLING AND APPLICATIONS OF SAME

(75) Inventors: Ming-Sheng Lai, Hsinchu (TW); Chih-Wei Wang, Hsinchu (TW); Hsueh-Ying Huang, Hsinchu (TW); Chen-Kuo Yang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 616 days.

This patent is subject to a terminal disclaimer.

(21) Appl. No.: 11/776,784

(22) Filed: Jul. 12, 2007

(65) Prior Publication Data
US 2009/0015529 A1    Jan. 15, 2009

(51) Int. Cl.
*G09G 3/36* (2006.01)
(52) U.S. Cl. .............................. 345/88; 345/87; 345/92
(58) Field of Classification Search ........... 345/87–100, 345/204–215, 690
See application file for complete search history.

(56) References Cited
U.S. PATENT DOCUMENTS 5,151,805 A    9/1992   Takeda et al.
5,296,847 A    3/1994   Takeda et al.
2004/0160405 A1    8/2004   Lin et al.
2009/0262056 A1*   10/2009  Yang et al. ................... 345/89

FOREIGN PATENT DOCUMENTS

CN    1800953 A    7/2006
EP    1239323 B1   7/2009

* cited by examiner

*Primary Examiner*—Vijay Shankar
(74) *Attorney, Agent, or Firm*—Tim Tingkang Xia; Morris, Manning & Martin, LLP

(57) ABSTRACT

A liquid crystal display (LCD) panel with color washout improvement. In one embodiment, the LCD panel includes a common electrode, a plurality of scanning lines, a plurality of data lines, and a plurality of pixels formed by the plurality of data lines crossing the plurality of scanning lines, each pixel comprising two or more sub-pixels, each sub-pixel comprising a sub-pixel electrode, a transistor electrically coupled to a corresponding scanning line, a corresponding data line and the sub-pixel electrode, a liquid crystal capacitor electrically coupled between the sub-pixel electrode and the common electrode, and a storage capacitor, wherein at least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels each is coupled between its corresponding sub-pixel electrode and the common electrode.

27 Claims, 9 Drawing Sheets

LIQUID CRYSTAL DISPLAY PANEL WITH COLOR WASHOUT IMPROVEMENT BY SCANNING LINE COUPLING AND APPLICATIONS OF SAME

FIELD OF THE INVENTION

The present invention relates generally to a liquid crystal display (LCD), and more particularly to an LCD apparatus having an LCD panel with color washout improvement by scanning line coupling and method of driving the same.

BACKGROUND OF THE INVENTION

Liquid crystal display (LCD) is commonly used as a display device because of its capability of displaying images with good quality while using little power. An LCD apparatus includes an LCD panel formed with liquid crystal cells and pixel elements with each associating with a corresponding liquid crystal cell and having a liquid crystal capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Liquid crystal molecules have a definite orientational alignment as a result of their long, thin shapes. The orientations of liquid crystal molecules in liquid crystal cells of an LCD panel play a crucial role in the transmittance of light therethorugh. For example, in a twist nematic LCD, when the liquid crystal molecules are in its tilted orientation, light from the direction of incidence is subject to various different indexes of reflection. Since the functionality of LCDs is based on the birefringence effect, the transmittance of light will vary with different viewing angles. Due to such differences in light transmission, optimum viewing of an LCD is limited within a narrow viewing angle. The limited viewing angle of LCDs is one of the major disadvantages associated with the LCDs and is a major factor in restricting applications of the LCDs.

Several approaches exist for increasing the viewing angles of LCDs, such as in-plane switching (IPS), and multi-domain vertical alignments. IPS mode uses comb-like inter-digitized electrodes to apply electrical fields in the plane of the substrates, thereby aligning the liquid crystal molecules along the substrates and providing wide viewing angles for use in wide viewing angle monitors or other applications. However, although IPS provides wide viewing angles, it requires high voltages and has low aperture ratios. In addition, due to the planar electric field structure, IPS mode inherently suffers from severe image sticking. In vertical alignment mode, a multi-domain arrangement is achieved by introducing a protruding structure that forces the liquid crystal molecules to tilt in different directions. However, vertical alignment mode requires an extra photolithography step during fabrication.

Therefore, a heretofore unaddressed need exists in the art to address the aforementioned deficiencies and inadequacies.

SUMMARY OF THE INVENTION

The present invention, in one aspect, relates to a liquid crystal display (LCD) panel with color washout improvement. In one embodiment, the LCD panel includes a common line; a plurality of scanning lines, $\{G_n\}$, n=1, 2, ..., N, spatially arranged along a row direction; and a plurality of data lines, $\{D_m\}$, m=1, 2, ..., M, spatially arranged crossing the plurality of scanning lines $\{G_n\}$ along a column direction perpendicular to the row direction. The LCD panel further includes a plurality of pixels spatially arranged in the form of a matrix, each pixel, $\{P_{n,m}\}$, located between two neighboring scanning lines $G_n$ and $G_{n+1}$ and two neighboring data lines $D_m$ and $D_{m+1}$, and comprising at least a first sub-pixel and a second sub-pixel. Each of the first sub-pixel and the second sub-pixel has a transistor having a gate, a source and a drain, a liquid crystal (LC) capacitor having a first terminal and a second terminal, and a storage capacitor having a first terminal and a second terminal. In one embodiment, each of the transistors T1 and T2 of the first and second sub-pixels of each pixel is a field-effect thin film transistor (TFT). The storage capacitor Cst1 of the first sub-pixel and the storage capacitor Cst2 of the second sub-pixel are identical or substantially different.

The gate, the source and the drain of the transistor T1 of the first sub-pixel are electrically coupled to the scanning line $G_n$, the data line $D_n$, and the source of the transistor T2 of the second sub-pixel, respectively. The first terminal and the second terminal of the LC capacitor Clc1 of the first sub-pixel are electrically coupled to the drain of the transistor T1 of the first sub-pixel and the common line, respectively. The first terminal of the storage capacitor Cst1 of the first sub-pixel is electrically coupled to the drain of the first transistor T1 of the first sub-pixel.

The gate and the drain of the transistor T2 of the second sub-pixel are electrically coupled to the scanning line $G_n$ and the first terminal of the LC capacitor Clc2 of the second sub-pixel, respectively. The second terminal of the LC capacitor Clc2 of the second sub-pixel is electrically coupled to the common line. The first terminal of the storage capacitor Cst2 of the second sub-pixel is electrically coupled to the drain of the transistor T2 of the second sub-pixel.

At least one of the second terminal of the storage capacitor Cst1 of the first sub-pixel and the second terminal of the storage capacitor Cst2 of the second sub-pixel is electrically coupled to the scanning line $G_{n-1}$ or the scanning line $G_{n+1}$, and the other of the second terminal of the storage capacitor Cst1 of the first sub-pixel and the second terminal of the storage capacitor Cst2 of the second sub-pixel is electrically coupled to the common line.

When a plurality of scanning signals sequentially is applied to the plurality of scanning lines $\{G_n\}$, a plurality of data signals is simultaneously applied to the plurality of data lines $\{D_n\}$, and a common signal is applied to the common line, potential differences are generated in the sub-pixel electrodes of the first and second sub-pixels of each pixel, respectively.

In one embodiment, each of the plurality of scanning signals comprises an electrical signal having a period and at least two potentials. The at least two potentials contains a high potential and a low potential adapted for respectively turning on and off the transistors T1 and T2 of the first and second sub-pixels of each pixel. In one embodiment, at least one of the plurality of scanning signals comprises a modulating signal having at least one potential that is substantially different from the high potential and the low potential of the at least one of the plurality of scanning signals. The at least one potential of the modulating signal is superposed with the at least one of the plurality of scanning signals in time before the high potential and/or after the low potential of the at least one of the plurality of scanning signals. In one embodiment, the modulating signal oscillates in time with at a modulating period, wherein the modulating period is correlated to the period of the at least one of the plurality of scanning signals.

In one embodiment, each of the plurality of data signals is decomposed into a number of frames, where each frame has a polarity that is opposite to that of its immediately prior and/or next frame.

In one embodiment, the common signal comprises an electrical signal having a constant potential or alternative potentials oscillating in time with a period.

In another aspect, the present invention relates to a liquid crystal display (LCD) panel. In one embodiment, the LCD panel has a common electrode; a plurality of scanning lines; and a plurality of data lines. Furthermore, the LCD panel has a plurality of pixels formed by the plurality of data lines crossing the plurality of scanning lines. Each pixel comprises two or more sub-pixels, where each of the two or more sub-pixels hasa sub-pixel electrode, a transistor having a gate, a source and a drain electrically coupled to a corresponding scanning line, a corresponding data line and the sub-pixel electrode, respectively, a liquid crystal (LC) capacitor electrically coupled between the sub-pixel electrode and the common electrode, and a storage capacitor, where at least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels each is coupled between its corresponding sub-pixel electrode and the common electrode. When a plurality of scanning signals is sequentially applied to the plurality of scanning lines, a plurality of data signals is simultaneously applied to the plurality of data lines, and a common signal is applied to the common electrode, potential differences are generated in the sub-pixel electrodes of the two or more sub-pixels of each pixel, respectively.

In one embodiment, each of the plurality of scanning signals comprises an electrical signal having a period and at least two potentials, where the at least two potentials contain a high potential and a low potential adapted for respectively turning on and off the transistors of the two or more sub-pixels of each pixel. At least one of the plurality of scanning signals comprises a modulating signal having at least one potential that is substantially different from the high potential and the low potential of the at least one of the plurality of scanning signals. The modulating signal oscillates in time with a modulating period, where the modulating period is correlated to the period of the at least one of the plurality of scanning signals. Each of the plurality of data signals is decomposed into a number of frames, each frame having a polarity that is opposite to that of its immediately prior and/or next frame. The common signal comprises an electrical signal having a constant potential or alternative potentials oscillating in time with a period.

In yet another aspect, the present invention relates to a method of driving a liquid crystal display (LCD) with color washout improvement. In one embodiment, the method includes comprising the step of providing an LCD panel. The LCD panel in one embodiment includes a common electrode; a plurality of scanning lines; a plurality of data lines; and a plurality of pixels formed by the plurality of data lines crossing the plurality of scanning lines, each pixel comprising two or more sub-pixels, each of the two or more sub-pixels comprising a sub-pixel electrode, a transistor having a gate, a source and a drain electrically coupled to a corresponding scanning line, a corresponding data line and the sub-pixel electrode, respectively, a liquid crystal (LC) capacitor electrically coupled between the sub-pixel electrode and the common electrode, and a storage capacitor, wherein at least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels each is coupled between its corresponding sub-pixel electrode and the common electrode. Furthermore, the method has the step of applying a plurality of driving signals to the LCD panel so as to generate potential differences in the sub-pixel electrodes of the two or more sub-pixels of each pixel, respectively. Additionally, the method has the step of generating the plurality of driving signals.

In one embodiment, the plurality of driving signals comprises a plurality of scanning signals sequentially applied to the plurality of scanning lines, a plurality of data signals simultaneously applied to the plurality of data lines, and a common signal applied to the common electrode. Each of the plurality of scanning signals comprises an electrical signal having a period and at least two potentials, where the at least two potentials has a high potential and a low potential adapted for respectively turning on and off the transistors of the two or more sub-pixels of each pixel. At least one of the plurality of scanning signals comprises a modulating signal having at least one potential that is substantially different from the high potential and the low potential of the at least one of the plurality of scanning signals, wherein the modulating signal oscillates in time with a modulating period, wherein the modulating period is correlated to the period of the at least one of the plurality of scanning signals. In one embodiment, each of the plurality of data signals is decomposed into a number of frames, each frame having a polarity that is opposite to that of its immediately prior and/or next frame. The common signal comprises an electrical signal having a constant potential or alternative potentials changing in time with a period.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

Figure 1:
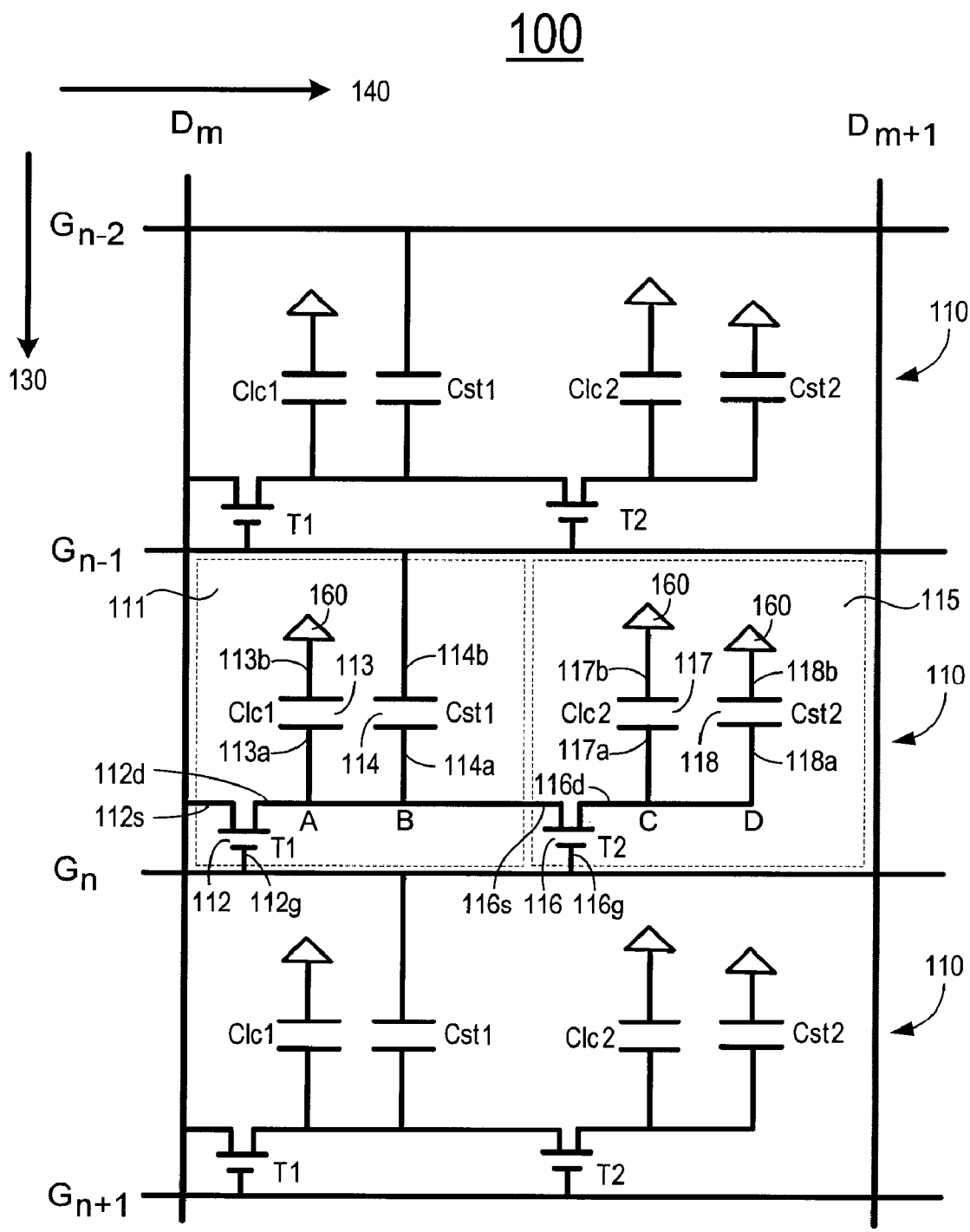
FIG. 1 partially shows schematically a circuit diagram of an LCD panel according to one embodiment of the present invention.
Figure 3:
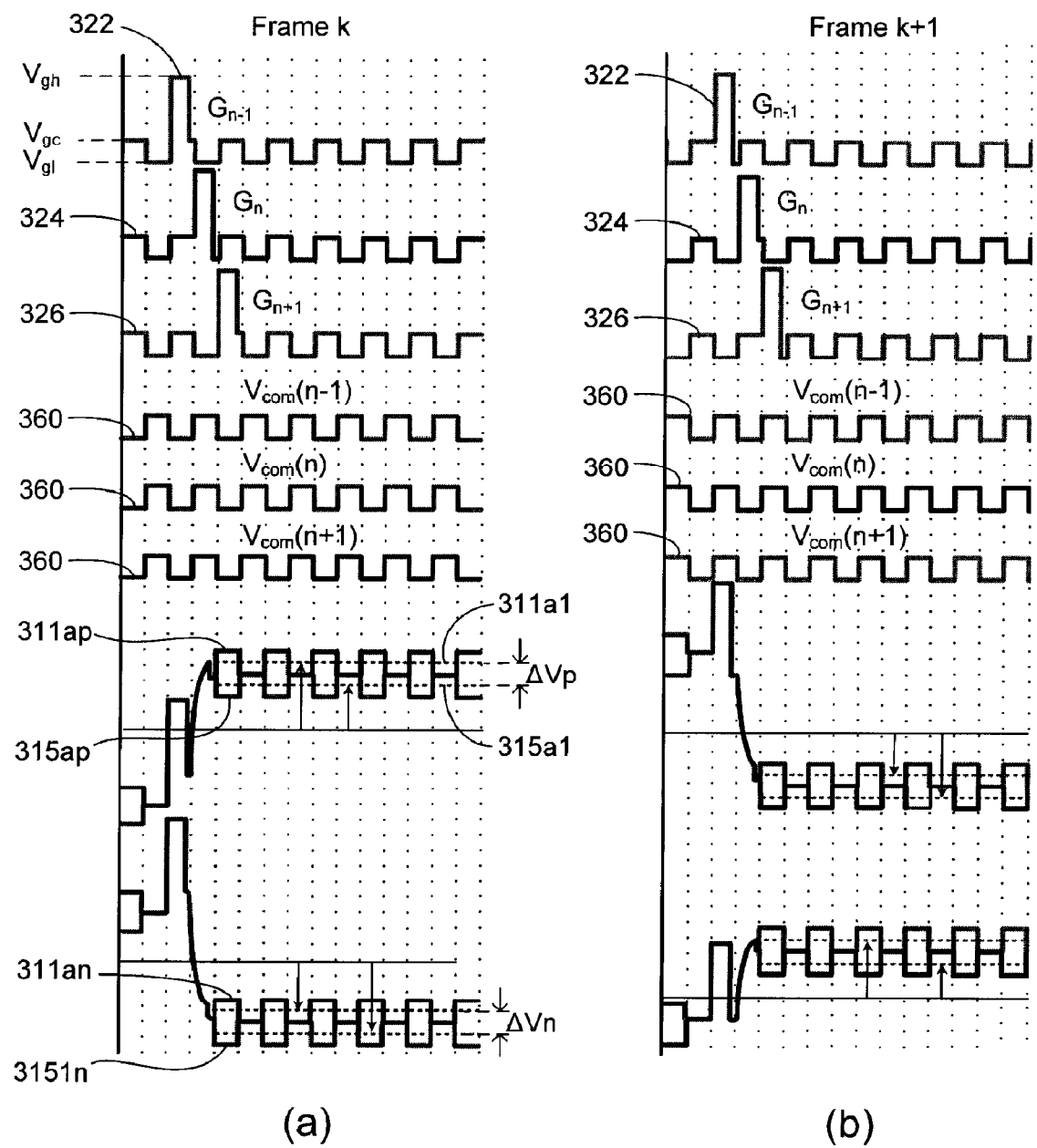
Figure 4:
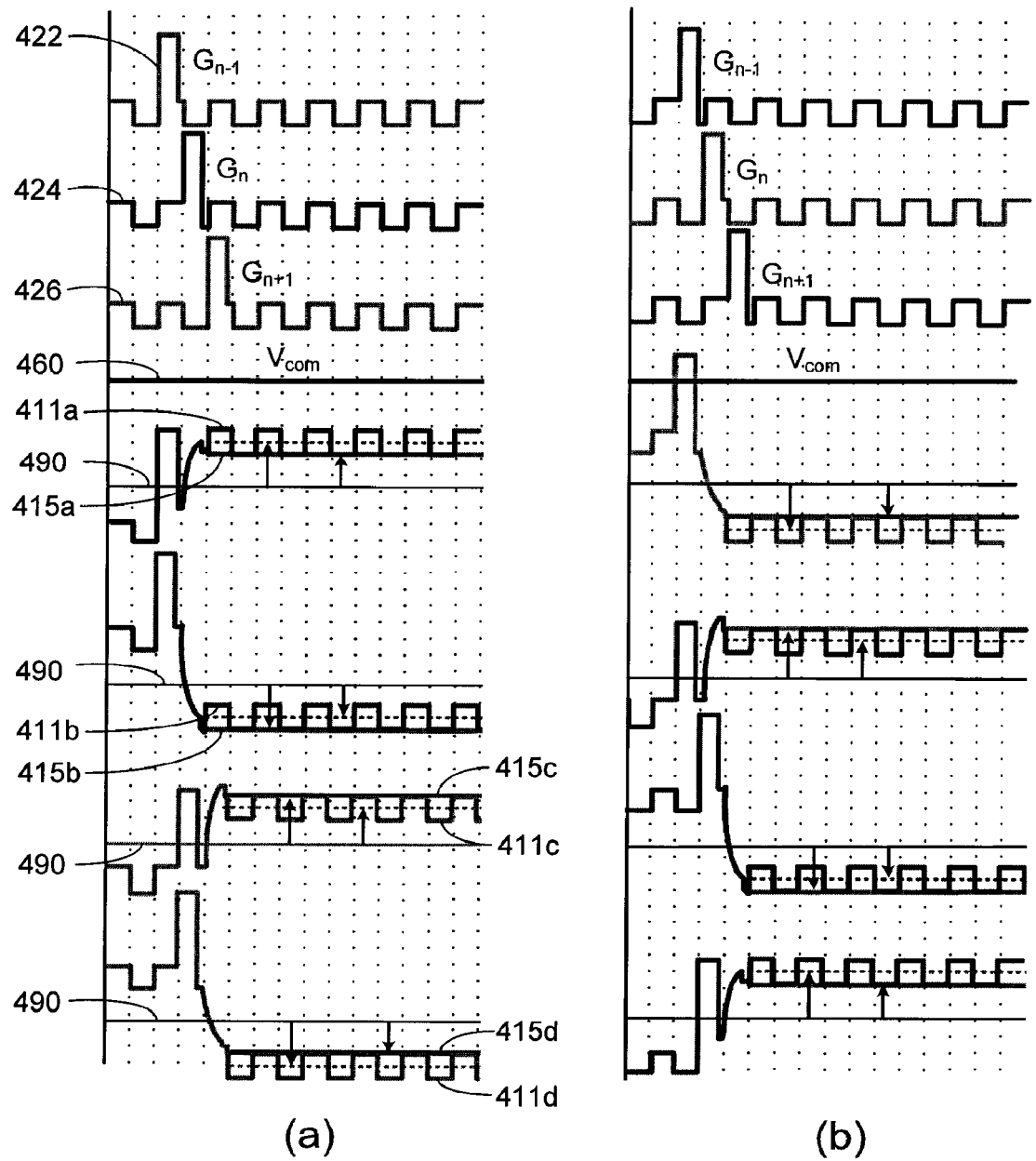
Figure 5:
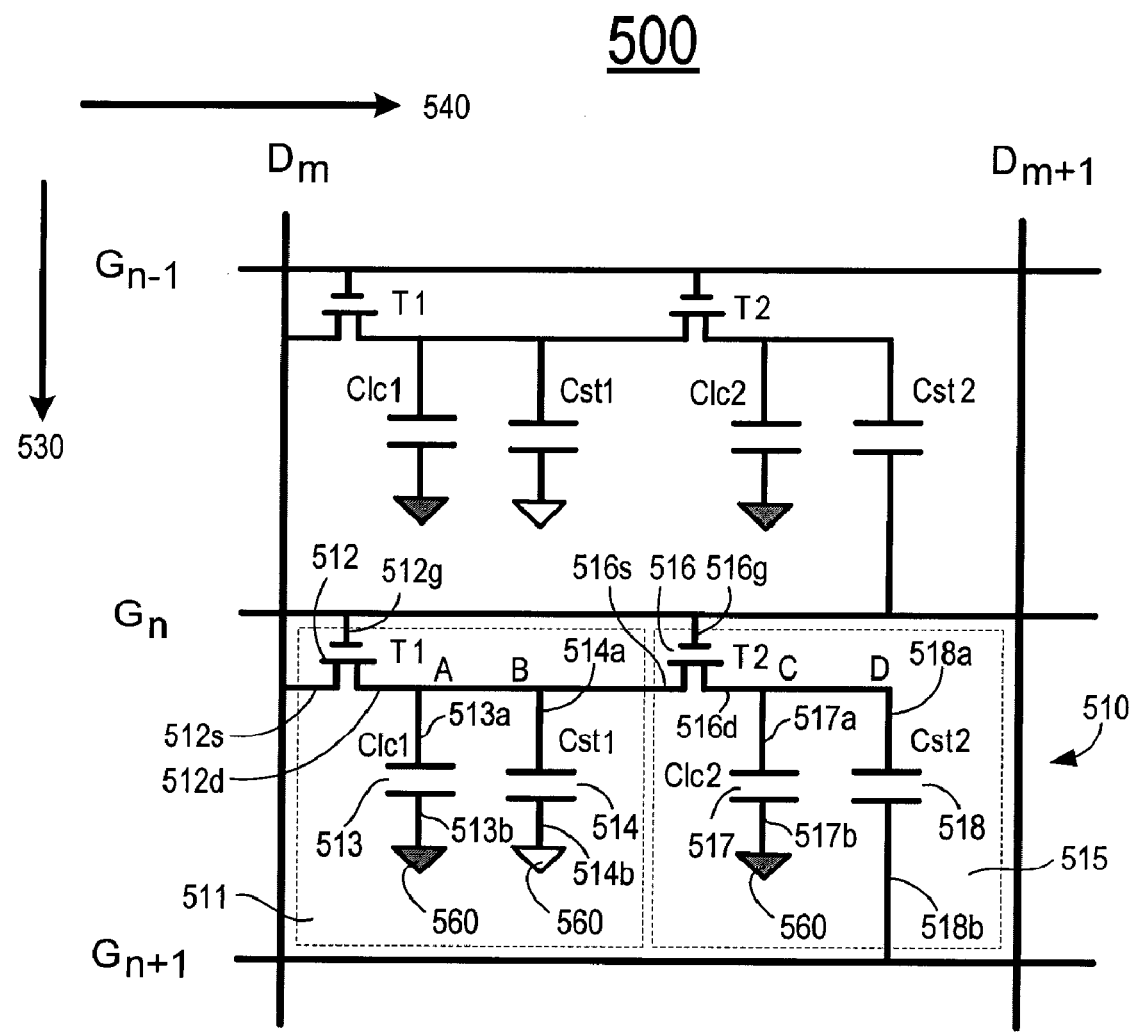
Figure 6:
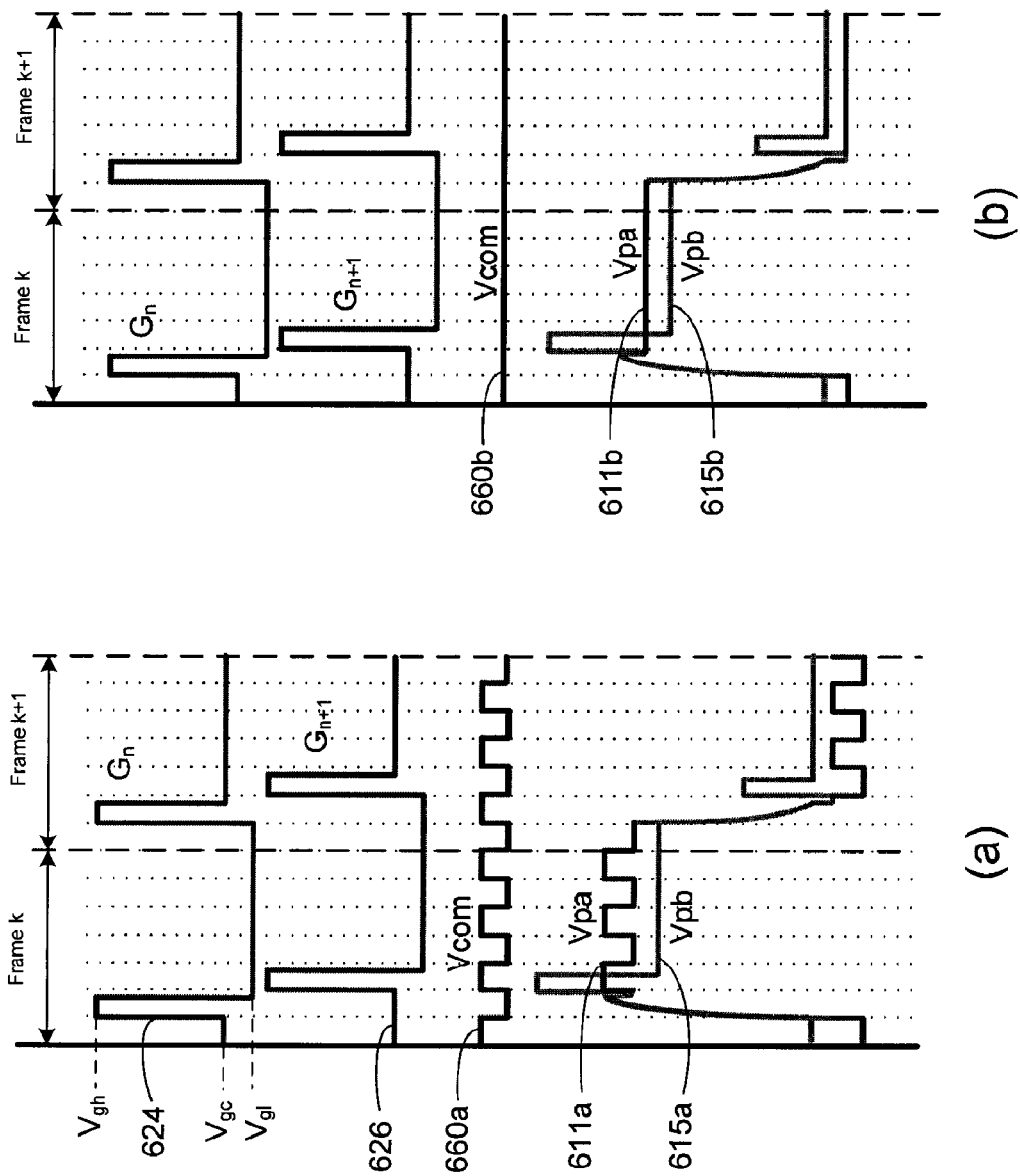

(a) and (c) for different driving signals, and (b) prolonged waveform charts of FIG. 2a for a specific time period;

FIG. 3 shows schematically waveform charts of driving signals applied to the LCD panel shown in FIG. 1, and corresponding potentials generated in sub-pixels of the LCD panel according to another embodiment of the present invention: (a) and (b) for different driving signals;

FIG. 4 shows schematically waveform charts of driving signals applied to the LCD panel shown in FIG. 1, and corresponding potentials generated in sub-pixels of the LCD panel according to an alternative embodiment of the present invention: (a) and (b) for different driving signals;

FIG. 5 partially shows schematically a circuit diagram of an LCD panel according to one embodiment of the present invention;

FIG. 6 shows schematically waveform charts of driving signals applied to the LCD panel shown in FIG. 5, and corresponding potentials generated in sub-pixels of the LCD panel according to one embodiment of the present invention: (a) and (b) for different driving signals; and FIG. 7 partially shows schematically a circuit diagram of an LCD panel according to one embodiment of the present invention.

Figure 8:
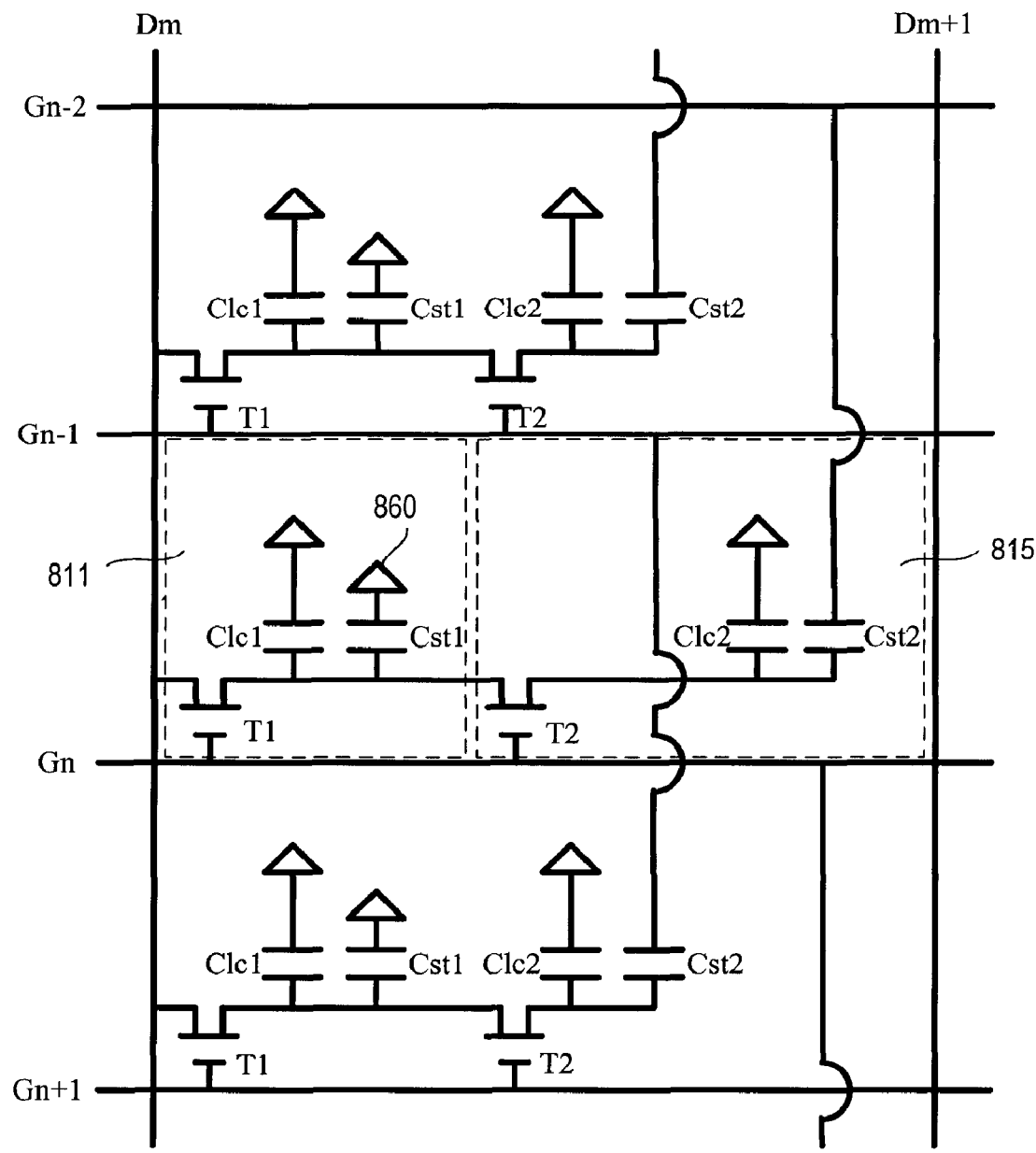

FIG. 8 partially shows schematically a circuit diagram of an LCD panel according to another embodiment of the present invention.

Figure 9:
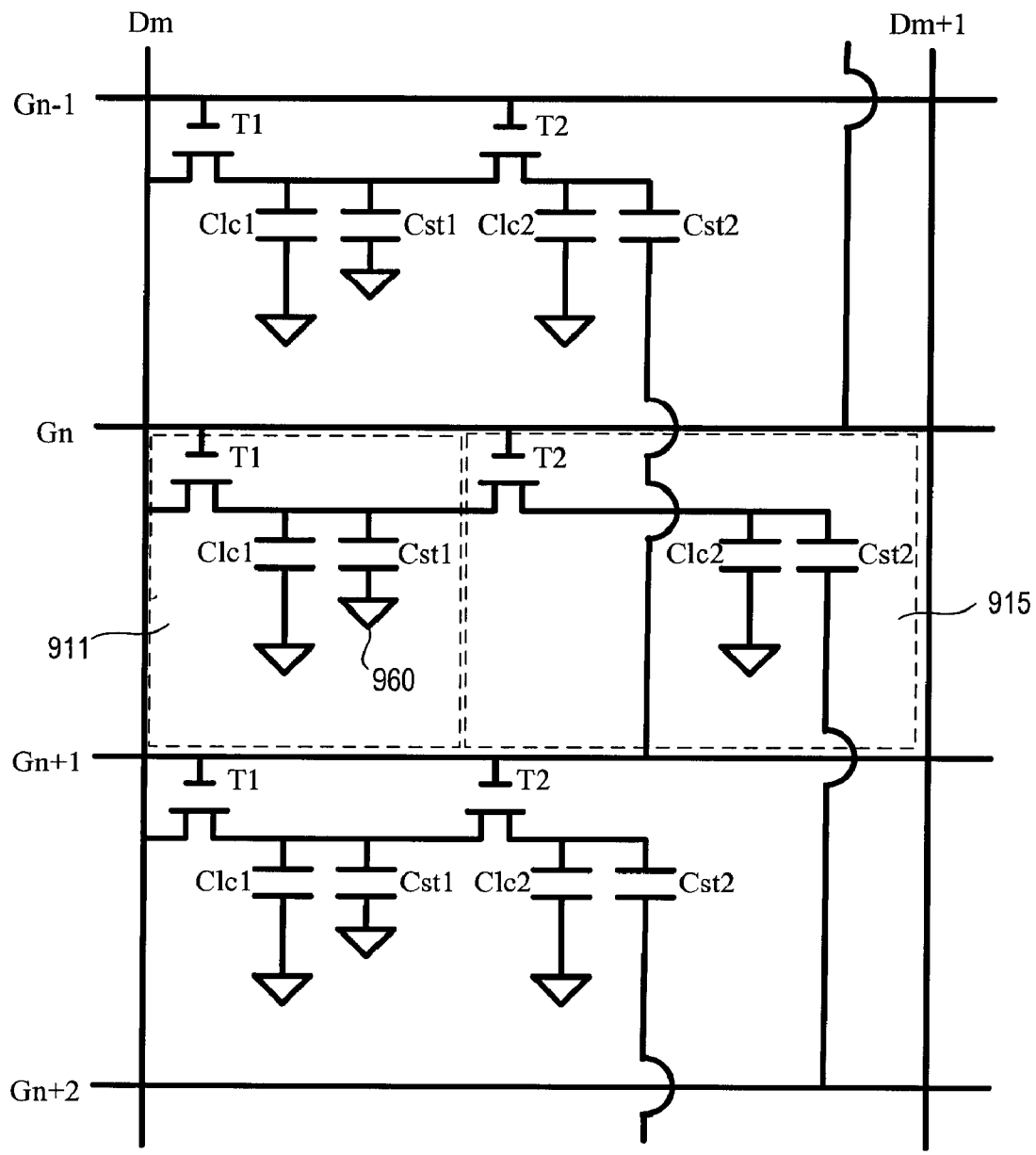

FIG. 9 partially shows schematically a circuit diagram of an LCD panel according to an alternative embodiment of the present invention.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-9. In accordance with the purposes of this invention, as embodied and broadly described herein, this invention, in one aspect, relates to an LCD panel with color washout improvement by scanning line coupling. The LCD panel includes a common electrode, a plurality of scanning lines, a plurality of data lines, and a plurality of pixels formed by the plurality of data lines crossing the plurality of scanning lines. Each pixel has two or more sub-pixels, where each sub-pixel includes a sub-pixel electrode, a transistor electrically coupled to a corresponding scanning line, a corresponding data line and the sub-pixel electrode, a liquid crystal capacitor electrically coupled between the sub-pixel electrode and the common electrode, and a storage capacitor. At least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels is electrically coupled between its corresponding sub-pixel electrode and the common electrode. For such an LCD panel, each of the two or more sub-pixels of a pixel has its own electric field (potential) produced with a variety of driving signals. The produced electric fields in the sub-pixels are substantially different from one another. That is the different electric fields in the two or more sub-pixels of the pixel that results in different alignments of the LC molecules in the two or more sub-pixels of the pixel, thereby improving color washout of the LCD panel.

Referring to FIG. 1, an LCD panel according to one embodiment of the present invention is partially and schematically shown. The LCD panel 100 includes a plurality of scanning lines, $G_1, G_2 \ldots, G_{n-1}, G_n, G_{n+1}, \ldots, G_N$, that are spatially arranged along a row (scanning) direction 130, and a plurality of data lines, $D_1, D_2, \ldots D_{m-1}, D_m, D_{m+1}, \ldots, D_M$, that are spatially arranged crossing the plurality of scanning lines $G_1, G_2, \ldots, G_{n-1}, G_n, G_{n+1}, \ldots G_N$ along a column direction 140 perpendicular to the row direction 130. N and M are integers greater than one. The LCD panel 100 further has a plurality of pixels 110 that are spatially arranged in the form of a matrix. Each pixel 110 is located between two neighboring scanning lines and two neighboring data lines. For the purpose of illustration of embodiments of the present invention, FIG. 1 schematically shows only four scanning lines $G_{n-2}, G_{n-1}, G_n$ and $G_{n+1}$ two data lines $D_m$ and $D_{m+1}$, and three corresponding pixels 110 of the LCD panel 100. Further, each pixel 110 is adapted to have two sub-pixels.

As shown in FIG. 1, a pixel 110 located, for example, between two neighboring scanning lines $G_{n-1}$ and $G_n$ and two neighboring data lines $D_m$ and $D_{m+1}$ crossing the two neighboring scanning lines $G_{n-1}$ and $G_n$, has a first sub-pixel 111 and a second sub-pixel 115. The first sub-pixel 111 includes a transistor T1, 112 having a gate 112g, a source 112s and a drain 112d that are electrically coupled to the scanning line $G_n$, the data line $D_n$, the source 116s of the transistor 116 of the second sub-pixel 115, respectively. The first sub-pixel 111 further includes an LC capacitor Clc1, 113 having a first terminal 113a and a second terminal 113b that are electrically coupled to the drain 112d of the transistor 112 and a common line 160, respectively, and a storage capacitor Cst1, 114 having a first terminal 114a and a second terminal 114b that are electrically coupled to the drain 112d of the transistor 112 and the scanning line $G_{n-1}$, respectively. The scanning line $G_{n-1}$ is immediately prior to the scanning line $G_n$ to which the gate 112g of the transistor T1 112 of the first sub-pixel 111 is electrically coupled. The second sub-pixel 115 has a transistor T2, 116, a LC capacitor Clc2, 117 and a storage capacitor Cst2, 118. The transistor T2 116 has a gate 116g, a source 116s and a drain 116d that are electrically coupled to the scanning line $G_n$, the drain 112d of the transistor 112 of the first sub-pixel 111, and the first terminal 117a of the LC capacitor Clc2 117, respectively. The second terminal 117b of the LC capacitor Clc2 117 is electrically coupled to the common line 160. The storage capacitor Cst2 118 has a first terminal 118a and a second terminal 118b that are electrically coupled to the drain 112d of the transistor 112 of the first sub-pixel 111 and the common line 160, respectively. The common line 160 is corresponding to a common electrode.

Additionally, each of the first sub-pixel 111 and the second sub-pixel 115 also includes a sub-pixel electrode (not shown), where the sub-pixel electrode of the first sub-pixel 111 has the nodes A and B, and the sub-pixel electrode of the second sub-pixel 115 has the nodes C and D, respectively. Alternatively, the nodes A and B are electrically coupled to the sub-pixel electrode of the first sub-pixel 111, and the nodes C and D are electrically coupled to the sub-pixel electrode of the second sub-pixel 115. In one embodiment, the sub-pixel electrodes of the first sub-pixel 111 and the second sub-pixel 115 of each pixel 110 are deposited on a first substrate, while the common electrode is deposited on a second substrate that is spatially apart from the first substrate. The LC molecules are filled into cells between the first and second substrates. Each cell is associated with a pixel 110 of the LCD panel 100. Voltages (potentials) applied to the sub-pixel electrodes control orientations of the LC molecules in the LC cells associated with the corresponding sub-pixels.

The transistor T1 112 and the transistor T2 116 are field-effect TFTs and adapted for activating the first sub-pixel 111 and the second sub-pixel 115, respectively. Other types of transistors can also be utilized to practice the present invention. When the transistor T1 112 and the transistor T2 116 are selected to be turned on by a scanning signal applied through the scanning line $G_n$ to which the gate 112g of the transistor T1 112 and the gate 116g of the transistor T2 116 are electrically coupled, a data signal applied through the corresponding data line $D_m$ is written into the first sub-pixel 111 and the second sub-pixel 115 by means of charging the corresponding LC capacitors Clc1 113 and Clc2 117, and storage capacitors Cst1 114 and Cst2 118. The charged potentials of the LC capacitors Clc1 113 and Clc2 117 of the first and second sub-pixels 111 and 115 of the pixel 110 are corresponding to the electrical fields applied to corresponding liquid crystal cells between the first and second substrates. The storage capacitor Cst1 114 and the storage capacitor Cst2 118 are adapted for providing coupling voltages to the corresponding LC capacitors Clc1 113 and Clc2 117, respectively, to compensate for charge leakages therefrom. The storage capacitors Cst1 114 and Cst2 118 of the first and second sub-pixels 111 and 115 can be identical or substantially different. In the exemplary embodiment shown in FIG. 1, the second terminal 114b of the storage capacitor Cst1 114 and the second terminal 118b of the storage capacitor Cst2 118 are electrically coupled to different sources, for example, the scanning line $G_{n-1}$ and the common line 160, respectively. If the driving signals applied to the scanning line $G_{n-1}$ and the common line 160 have different waveforms and potentials, waveform and potential differences between the LC capacitor Clc1 113 of the first sub-pixel 111 and the LC capacitor Clc2 117 of the second sub-pixel 115 may be achieved by the scanning line coupling. In other words, the LC molecules associated with the first sub-pixel 111 and the second sub-pixel 115 may be aligned at different orientations responsive to the different waveforms and potentials of the LC capacitors Clc1 113 and Clc2 117, respectively.

The driving signals include a plurality of scanning signals, a plurality of data signals, and a common signal. Each of the plurality of scanning signals is an electrical signal having a period and at least two potentials (values of voltage). The at least two potentials includes a high potential and a low potential used to turn on and off the transistors of the sub-pixels of each pixel, respectively. Among the plurality of scanning signals, at least one scanning signal comprises a modulating signal having at least one modulating potential that is substantially different from the high potential and the low potential of the at least one scanning signal. The modulating signal may oscillate in time with a modulating period, where the modulating period is correlated to the period of the at least one scanning signal. To control the generation of coupling voltages between the sub-pixel electrodes and the common electrode, the at least one potential of the modulating signal is preferably modulated into the at least one scanning signal before the high potential and/or after the low potential of the at least one scanning signal. Furthermore, the plurality of data signals of two consecutive frames of an image may have opposite polarities. Additionally, the common signal can be a constant potential or alternative potentials changing in time with a period.

Figure 2:
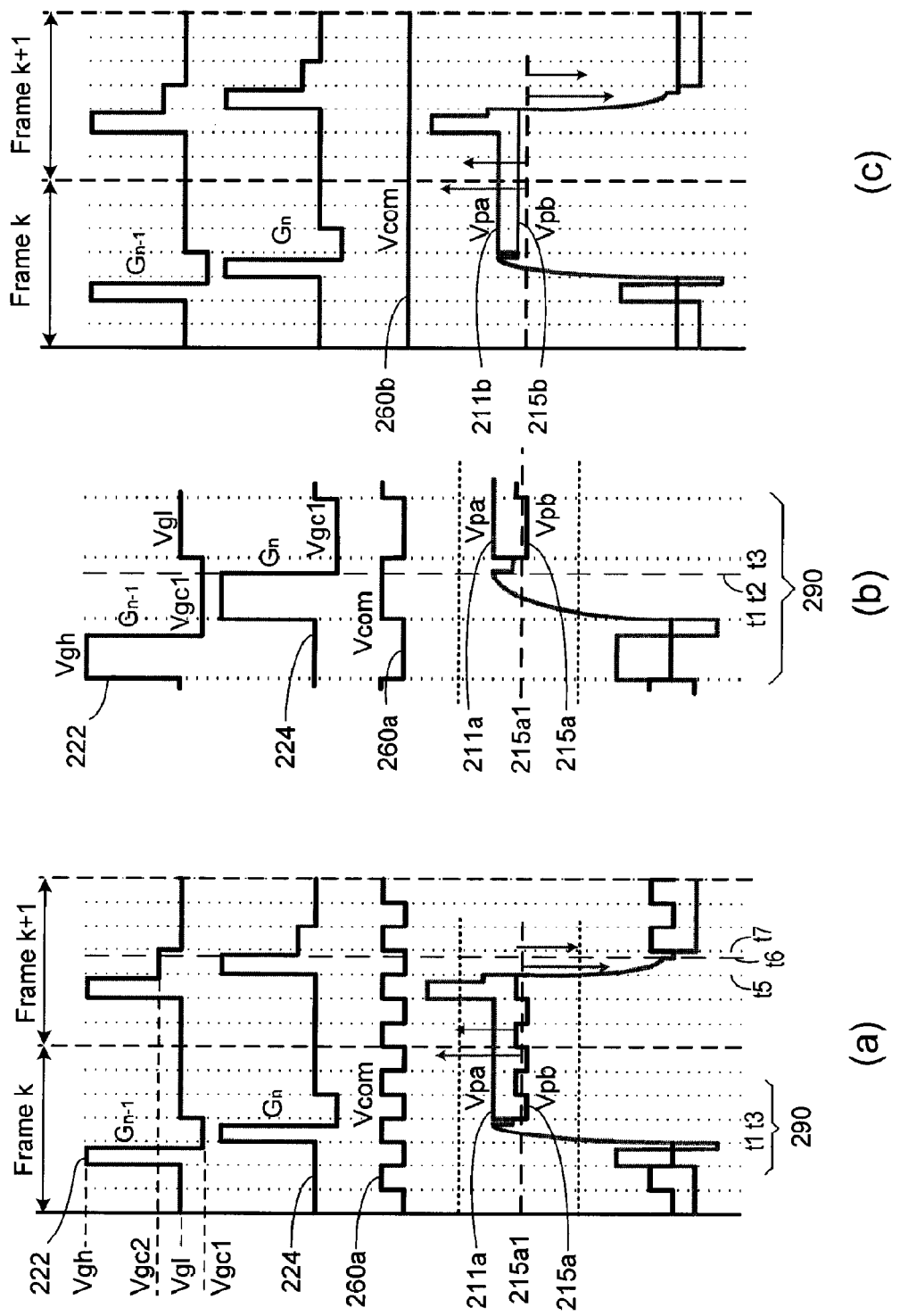
FIG. 2 shows schematically waveform charts of driving signals applied to the LCD panel shown in FIG. 1, and corresponding potentials generated in sub-pixels of the LCD panel according to one embodiment of the present invention.

Referring to FIGS. 2-4, waveform charts of the driving signals applied to the LCD panel of FIG. 1 and corresponding potentials (coupling voltages) generated in the sub-pixels of the LCD panel are shown according to various embodiments of the present invention.

In FIG. 2, the scanning signals 222 and 224 sequentially applied to the scanning lines $G_{n-1}$ and $G_n$ have four potentials (values of voltage), Vgh, Vgc2, Vhl and Vgc1, where Vgh>Vgc2>Vhl>Vgc1. The potentials Vgh and Vgl are corresponding to a high potential and a low potential of the scanning signal 222 or 224 and adapted for turning on and off the corresponding transistors T1 and T2 of the first and second sub-pixels, respectively. While the potentials Vgc1 and Vgc2 are corresponding to two modulating potentials modulated into the scanning signal 222 or 224 and used to control the generation of the coupling voltages in the first and second sub-pixels, respectively. In this exemplary example, the modulating potentials Vgc1 and Vgc2 are superposed with the scanning signal 222 or 224 just after the time period of the high potential Vgh of the scanning signal 222 or 224, i.e., after the transistors T1 and T2 are turned off. Additionally, the frequency of the modulating potentials is substantially coincident with the frequency of the scanning signal 222 or 224.

The waveform 260a in FIGS. 2a and 2b is corresponding to a common signal, Vcom, having a rectangle wave of two level oscillations applied to the common line (electrode), while the waveform 260b in FIG. 2c is the common signal Vcom having a constant potential applied to the common line. The waveforms 211a and 215a in FIGS. 2a and 2b respectively represent the potentials, Vpa and Vpb, at the sub-pixel electrodes (the nodes A and C of FIG. 1) of the first and second sub-pixels for the applied common signal having the rectangle wave of two level oscillations. FIG. 2b is the prolonged waveform charts of FIG. 2a for a time period 290. The waveforms 211b and 215b in FIG. 2c are respectively corresponding to the potentials Vpa and Vpb at the sub-pixel electrodes of the first and second sub-pixels for the constant potential common signal Vcom.

As shown in FIGS. 2a and 2b, when the scanning signal 224 applied to the scanning line $G_n$ is at its high potential Vgh, at time t1, the transistor T1 and T2 of the first and second sub-pixels are turned on, and the LC capacitors Clc1 and Clc2 and the storage capacitors Cst1 and Cst2 of the first and second sub-pixels start being charged responsive to the k-th frame data signal applied through the data line $D_m$, where k is a positive integer. The charging process of the LC capacitors Clc1 and Clc2 and the storage capacitors Cst1 and Cst2 of the first and second sub-pixels lasts until time t2. Times t1 and t2 are coincident with the start time and the end time of the high potential Vgh of the scanning signal 224, as shown in FIG. 2a. Accordingly, both potentials Vpa 211a and Vpb 215a of the sub-pixel electrodes of the first and second sub-pixels increase dramatically in the time period of (t2-t1). When the potential of the scanning signal 224 applied to the scanning line $G_n$ drops from its high potential Vgh to its modulating potential Vgc1 at time t2, the transistors T1 and T2 of the first and second sub-pixels are turned off, and both potentials Vpa 211a and Vpb 215a reduce slightly due to the feedthrough effect. During the time period of (t2-t1), the variations of both potentials Vpa 211a and Vpb 215a of the sub-pixel electrodes of the first and second sub-pixels are same. No potential difference in the first and second sub-pixels is generated in the time period of (t2-t1).

However, after time t2, the potentials Vpa 211a and Vpb 215a of the sub-pixel electrodes of the first and second sub-pixels vary differently. For the potential Vpa 211a of the sub-pixel electrode of the first sub-pixel where the storage capacitor Cst1 is electrically coupled between the sub-pixel electrode of the first sub-pixel and the scanning ling $G_{n-1}$ immediately prior to the scanning line $G_n$, when the potential of the scanning signal 222 applied to the scanning ling $G_{n-1}$ increases from its modulating potential Vgc1 to its low potential Vgl (Vgl>Vgc1) at time t3, due to the capacitive coupling effect, the potential Vpa 211a of the sub-pixel electrode of the first sub-pixel increases responsively to the potential increase of the scanning signal 222 applied to the scanning ling $G_{n-1}$. After time t3, but before time t5 when the transistors T1 and T2 of the first and second sub-pixels are turned on again, by a sequentially high potential Vgh of the scanning signal 224 applied to the scanning line $G_n$, the waveform of the potential 211a of the sub-pixel electrode of the first sub-pixel is same as that of the scanning signal 222 applied to the scanning ling $G_{n-1}$ in the time period of (t5-t3). For the potential Vpb 215a of the sub-pixel electrode of the second sub-pixel, however, since the storage capacitor Cst2 of the second sub-pixel electrically coupled between the sub-pixel electrode of the second sub-pixel and the common electrode, it oscillates in the time period of (t5-t3), responsively to the common signal Vcom 260a that is the rectangle wave of two level oscillations, due to the capacitive coupling effect. Further, the mean value 215a1 of the potential Vpb 215a of the sub-pixel electrode of the second sub-pixel is lower than the potential Vpa 211a of the sub-pixel electrode of the first sub-pixel.

At time t5, the scanning signal 224 changes from its low potential Vgl to its high potential Vgh so as to turn on the transistor T1 and T2 of the first and second sub-pixels again, and the LC capacitors Clc1 and Clc2 and the storage capacitors Cst1 and Cst2 of the first and second sub-pixels start being recharged responsive to the (k+1)-th frame data signal applied through the data line $D_m$. The recharging process of the LC capacitors Clc1 and Clc2 and the storage capacitors Cst1 and Cst2 of the first and second sub-pixels lasts until time t6 when the scanning signal 224 changes from its high potential Vgh to its low potential Vgl. During the recharging period of (t6-t5), both the potential Vpa 211a and Vpb 215a generated in the first and second sub-pixels are almost same. Since the polarity of the data signal applied to the data line $D_m$ at the (k+1)-th frame is substantially opposite to the one of the data signal applied to the data line $D_m$ at the k-th frame, the potentials Vpa 211a and Vpb 215a of the sub-pixel electrodes of the first and second sub-pixels in the time period of (t6-t5) vary reversely, compared to that in the time period of (t2-t1). At time t6, the potential of the scanning signal 224 applied to the scanning line $G_n$ switches from its high potential Vgh to its modulating potential Vgc2, the transistors T1 and T2 of the first and second sub-pixels are turned off, and both the potentials Vpa 211a and Vpb 215a further reduce slightly due to the feedthrough effect, until time t7 when the potential of the scanning signal 222 applied to the scanning line $G_{n-1}$ switches from its modulating potential Vgc2 to its low potential Vgl. After time t7, but before the next time when the transistor T1 and T2 of the first and second sub-pixels are turned on, the waveform of the potential 211a of the first sub-pixel is same as that of the scanning signal 222 applied to the scanning ling $G_{n-1}$, while the waveform of the potential Vpb 215a of the second sub-pixel is same as that of the common signal 260a. Accordingly, the potential differences in the first and second sub-pixels are produced. Additionally, the variations of the potentials Vpa 211a and Vpb 215a of the sub-pixel electrodes of the first and second sub-pixels during this period are reversely, compared to that during the time period of (t5-t1), as shown in FIG. 2a.

For the constant potential common signal, represented by waveform 260b, the differences between the potentials Vpa 211b and Vpb 215b of the first and second sub-pixels are also obtained, as shown in FIG. 2c. That is, in one pixel, two or more different potentials (two or more different electric fields) are established for such driving signals.

FIG. 3 shows the waveform charts of the scanning signals, the common signal, and the corresponding potentials generated in the sub-pixel electrodes of the first and second sub-pixels of a pixel of the LCD panel. In this exemplary embodiment, the scanning signals 322, 324 and 326 sequentially applied to the scanning lines $G_{n-1}$, $G_n$ and $G_{n+1}$ have three levels (potentials), Vgh, Vgc and Vhl, where Vgh>Vgc>Vgl. The potentials Vgh and Vgl of the scanning signals 322, 324 and 326 are adapted for respectively turning on and off the transistors T1 and T2 of the first and second sub-pixels of each pixel associated with the scanning line $G_{n-1}$, $G_n$ and $G_{n+1}$, while the potential Vgc is corresponding to a modulating potential used to control the generation of coupling voltages in the first and/or second sub-pixels of each pixel. During the time period between two consecutive high potentials Vgh, each of the scanning signals 322, 324 and 326 oscillates between the modulating potential Vgc and the low potential Vgl. Additionally, the common signal 360 applied to the common electrode is a rectangle wave alternating between two levels (potentials).

For such driving signals applied to the LCD penal shown in FIG. 1, one pixel may have different electric fields produced in different sub-pixels. For example, for a pixel associated with the scanning line $G_n$, its first and second sub-pixels have their own potentials, which are respectively represented by waveforms 311ap and 315ap for the k-th frame data signal having a positive polarity, and waveforms 311an and 315an for the k-th frame data signal having a negative polarity, as shown in FIG. 3a. During the time period of which the transistor T1 and T2 of the first and second sub-pixels are turned on, by the high potential Vgh of the scanning signal 324 applied to the scanning line $G_n$, the LC capacitors Clc1 and Clc2 and the storage capacitors Cst1 and Cst2 of the first and second sub-pixels are charged. Accordingly, the potentials of the first and second sub-pixels change substantially according to the data signal applied through the data line $D_m$. If the data signal has a positive polarity, the potentials, waveforms 311ap and 315ap, of the first and second sub-pixels increase dramatically, otherwise, the potentials, waveforms 311an and 315an, of the first and second sub-pixels decrease dramatically for the data signal having a negative polarity, as shown in FIG. 3a. During the time period of which the transistor T1 and T2 of the first and second sub-pixels are turned off, the potential, waveform 311ap or 311an, of the first sub-pixel is determined by the scanning signal 322 applied to the scanning line $G_{n-1}$, while the potential, waveform 315ap or 315an, of the second sub-pixel is determined by the common signal 360 applied to the common electrode. For the k-th frame data signal having the positive polarity, as shown by waveforms 311ap and 315ap of FIG. 3a, the potential of the first sub-pixel oscillates in accordance with the scanning signal 322 and have a mean value 311a1, and the potential of the second sub-pixel alternates in accordance with the common signal 360 and have a mean value 315a1. Both the first and second sub-pixels have a potential difference of ΔVp generated. For the k-th frame data signal having the negative polarity, as shown by waveforms 311an and 315an of FIG. 3a, the difference between the potentials of the first and second sub-pixels is obtained to be ΔVn.

For the (k+1)-th frame data signal applied to the data line $D_m$, as shown in FIG. 3b, the variations of the generated potentials of the first and second sub-pixels are reversely, compared to those for the k-th frame data signal applied to the data line $D_m$, as shown in FIG. 3a.

FIG. 4 shows the waveform charts of the scanning signals same as the ones shown in FIG. 3 and the common signal of a constant potential, and the corresponding potentials generated in the sub-pixels of each pixel of the LCD panel when the scanning signals and the common signal are applied. As shown in FIG. 4a, waveforms 411a and 415a are the potentials of the first and second sub-pixels, respectively, for the driving signals of the k-th frame data signal with a positive polarity; waveforms 411b and 415b are the potentials of the first and second sub-pixels, respectively, for the driving signals of the k-th frame data signal with a negative polarity; waveforms 411c and 415c are the potentials of the first and second sub-pixels, respectively, for the driving signals of the (k+1)-th frame data signal with a positive polarity; and waveforms 411d and 415d are the potentials of the first and second sub-pixels, respectively, for the driving signals of the (k+1)-th frame data signal with a negative polarity. In all these embodiments, the potential differences in the first and second sub-pixels of each pixel of the LCD panel are produced during the time period of which the transistors T1 and T2 of the first and second sub-pixels are turned off. Furthermore, the waveforms of the potentials of the first and second sub-pixels are identical to the waveforms of the scanning signals and the common signal, respectively, in the time period. FIG. 4b is corresponding to the scanning signal having an opposite polarity to that of the scanning signals of FIG. 4a. Similarly, there are potential differences produced in the first and second sub-pixels of each pixel of the LCD panel.

Referring to FIG. 5, an LCD panel 500 with color washout improvement is shown according another embodiment of the present invention. Similar to the LCD panel shown in FIG. 1, the LCD panel 500 has a plurality of scanning lines, $G_1, G_2, \ldots, G_{n-1}, G_n, G_{n+1}, \ldots, G_N$, spatially arranged along a row direction 530, a plurality of data lines, $D_1, D_2, \ldots, D_{m-1}, D_m, D_{m+1}, \ldots, D_M$, spatially arranged crossing the plurality of scanning lines $G_1, G_2, \ldots, G_{n-1}, G_n, G_{n+1}, \ldots, G_N$ along a column direction 540 perpendicular to the row direction 530, and a plurality of pixels 510, each pixel 510 located between two neighboring scanning lines and two neighboring data lines. Each pixel 510 includes at least a first sub-pixel 511 and a second sub-pixel 515.

The first sub-pixel 511 includes a transistor, T1, 512 having a gate 512g, a source 512s and a drain 512d that are electrically coupled to the scanning line $G_n$, the data line $D_m$, and a node A, respectively. The first sub-pixel 511 also includes an LC capacitor, Clc1, 513 having a first terminal 513a and a second terminal 513b that are electrically coupled to the node A and a common line 560, respectively, and a storage capacitor, Cst1, 514 having a first terminal 514a and a second terminal 514b that are electrically coupled to a node B and the common line 560, respectively. The node B is electrically coupled to the node A. The second sub-pixel 515 has a transistor, T2, 516, a LC capacitor, Clc2, 517 and a storage capacitor, Cst2, 518. The transistor T2 516 has a gate 516g, a source 516s and a drain 516d that are electrically coupled to the scanning line $G_n$, the node B, and a node C, respectively. The LC capacitor Clc2 517 has a first terminal 517a electrically coupled to the node C and a second terminal 517b electrically coupled to the common line 560. The storage capacitor Cst2 518 has a first terminal 518a and a second terminal 518b that are electrically coupled to a node D and the scanning line $G_{n+1}$, respectively. The scanning line $G_{n+1}$ is immediately next to the scanning line $G_n$ to which the gate 516g of the transistor T2 516 is electrically coupled. The node D is electrically coupled to the node C.

Each of the first sub-pixel 511 and the second sub-pixel 515 also include a sub-pixel electrode, where the sub-pixel electrode of the first sub-pixel 511 comprises the nodes A and B, and the sub-pixel electrode of the second sub-pixel 515 comprises the nodes C and D, respectively.

Referring to FIG. 6, waveform charts of the driving signals applied to the LCD panel of FIG. 5 and corresponding potentials generated in the sub-pixels of the LCD panel are shown. In this embodiment, the scanning signals 624 and 626 sequentially applied to the scanning lines $G_n$ and $G_{n+1}$ have three potentials (levels), Vgh, Vgc and Vhl, where Vgh>Vgc>Vhl. The potentials Vgh and Vgl are adapted for respectively turning on and off the corresponding transistor T1 and T2 of the first and second sub-pixels. While the potential Vgc is used to control the generation of the coupled voltages in the first and second sub-pixels. The waveform 660a in FIG. 6a is corresponding to a common signal, Vcom, of a rectangle wave of two level oscillations applied through the common line (electrode), while the waveform 660b in FIG. 6b is corresponding to a common signal, Vcom, of a constant potential applied through the common line.

The waveforms 611a and 615a in FIG. 6a represent the potentials, Vpa and Vpb, at the sub-pixel electrodes (the nodes A and C of FIG. 5) of the first and second sub-pixels, respectively, for the applied common signal having the rectangle wave of two level oscillations. The waveforms 611b and 615b in FIG. 6b represent the potentials Vpa and Vpb at the sub-pixel electrodes of the first and second sub-pixels, respectively, for the applied common signal Vcom having the constant potential.

As shown in FIG. 6a, during the time period of which the transistor T1 and T2 of the first and second sub-pixels are turned on by the high potential Vgh of the scanning signal 624 applied to the scanning line $G_n$, the LC capacitors Clc1 and Clc2 and the storage capacitors Cst1 and Cst2 of the first and second sub-pixels are simultaneously charged, and the potentials 611a and 615a of the first and second sub-pixels change simultaneously to a level that is determined by the data signal of a frame of an image applied through the data line $D_m$. In this period, both potentials are almost same and no potential difference could be produced in the first and second sub-pixels. However, when the transistor T1 and T2 of the first and second sub-pixels are turned off, due to the capacitive coupling effect, the potential 611a of the first sub-pixel is determined by the common signal applied to the common electrode while the potential 615a of the second sub-pixel is determined by the scanning signal 626 applied to the scanning line $G_{n+1}$, because the storage Cst1 of the first sub-pixel is electrically coupled between the sub-pixel electrode and the common electrode and the storage Cst2 of the second sub-pixel is electrically coupled between the sub-pixel electrode and the scanning line $G_{n+1}$. Accordingly, the potential difference is produced in the first and second sub-pixels of each pixel of the LCD panel, as shown in FIG. 6a.

When the common signal is a constant potential signal, represented by waveform 660b, the difference between the potentials 611b and 615b of the first and second sub-pixels of a pixel can also be obtained, as shown in FIG. 6b.

Figure 7:
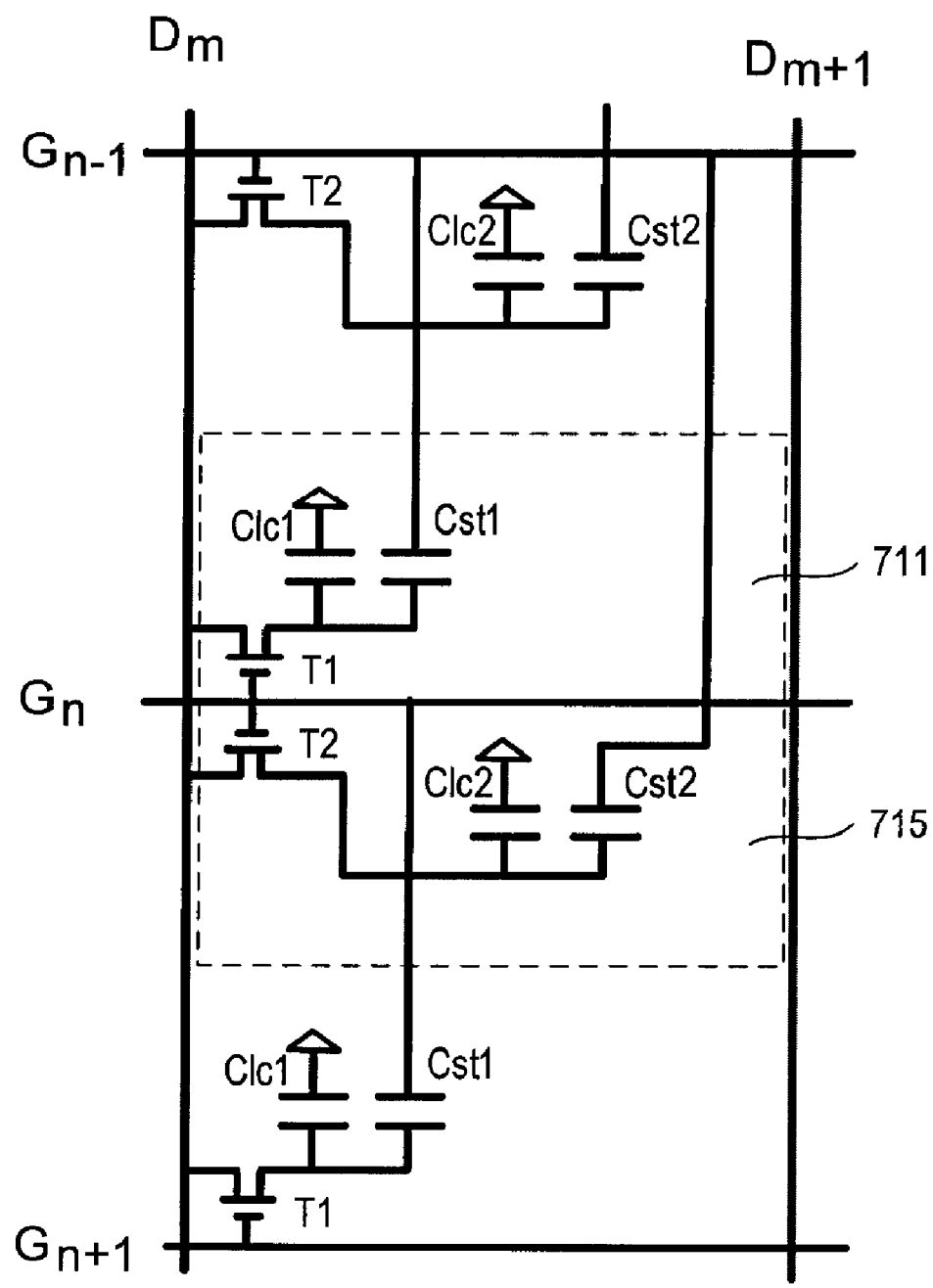

FIG. 7 shows an alternative embodiment of the LCD panel 700 with color washout improvement according to the present invention. The LCD panel 700 is similar to that shown in FIG. 1, but each of the storage capacitors Cst1 and Cst2 of the first sub-pixel 711 and the second sub-pixel 715 are electrically coupled between its corresponding sub-pixel electrode and the scanning line $G_{n-1}$ immediately prior to the scanning line Gn. In this embodiment, both the capacitors Cst1 and Cst2 are substantially different. The potential difference between the first and second sub-pixels can be achieved for different driving signals.

Referring to FIG. 8, an LCD panel 800 with color washout improvement is shown according to one embodiment of the present invention. The LCD panel 800 is similar to that shown in FIG. 1, but the storage capacitor Cst1 of the first sub-pixel 811 is electrically coupled between its corresponding sub-pixel electrode and the common line 860, and the storage capacitor Cst2 of the second sub-pixel 815 is electrically coupled between its corresponding sub-pixel electrode and the scanning line $G_{n-2}$ immediately two lines prior to the scanning line Gn. In this embodiment, both the capacitors Cst1 and Cst2 are substantially different. The potential difference between the first and second sub-pixels can be achieved for different driving signals.

FIG. 9 shows an LCD panel 900 with color washout improvement according to another embodiment of the present invention. The LCD panel 900 is similar to that shown in FIG. 1, but the storage capacitor Cst1 of the first sub-pixel 911 is electrically coupled between its corresponding sub-pixel electrode and the common line 960, and the storage capacitor Cst2 of the second sub-pixel 915 is electrically coupled between its corresponding sub-pixel electrode and the scanning line $G_{n+2}$ immediately two lines after the scanning line Gn. In this embodiment, both the capacitors Cst1 and Cst2 are substantially different. The potential difference between the first and second sub-pixels can be achieved for different driving signals.

One aspect of the present invention provides a method of improving color washout of an LCD device. In one embodiment, the method includes the steps of providing an LCD panel as disclosed above, and applying a plurality of driving signals to the LCD panel so as to generate potential differences among the sub-pixel electrodes of the two or more sub-pixels of each pixel. The plurality of driving signals include a plurality of scanning signals sequentially applied to the plurality of scanning lines, a plurality of data signals simultaneously applied to the plurality of data lines, and a common signal applied to the common electrode.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD) panel with color washout improvement, comprising:

a. a common line;

b. a plurality of scanning lines, $\{G_n\}$, n=1, 2, . . . , N, spatially arranged along a row direction;

c. a plurality of data lines, $\{D_m\}$, m=1, 2, . . ., M, spatially arranged crossing the plurality of scanning lines $\{G_n\}$ along a column direction perpendicular to the row direction; and d. a plurality of pixels spatially arranged in the form of a matrix, each pixel, $\{P_{n,m}\}$, located between two neighboring scanning lines $G_n$ and $G_{n+1}$ and two neighboring data lines $D_m$ and $D_{m+l}$, and comprising at least a first sub-pixel and a second sub-pixel, each of the first sub-pixel and the second sub-pixel comprising a transistor having a gate, a source and a drain, a liquid crystal (LC) capacitor having a first terminal and a second terminal, and a storage capacitor having a first terminal and a second terminal, wherein the gate, the source and the drain of the transistor T1 of the first sub-pixel are electrically coupled to the scanning line $G_n$, the data line $D_n$, and the source of the transistor T2 of the second sub-pixel, respectively;

wherein the first terminal and the second terminal of the LC capacitor C1c1 of the first sub-pixel are electrically coupled to the drain of the transistor T1 of the first sub-pixel and the common line, respectively;

wherein the first terminal of the storage capacitor Cst1 of the first sub-pixel is electrically coupled to the drain of the first transistor T1 of the first sub-pixel;

wherein the gate and the drain of the transistor T2 of the second sub-pixel are electrically coupled to the scanning line $G_n$ and the first terminal of the LC capacitor C1c2 of the second sub-pixel, respectively;

wherein the second terminal of the LC capacitor C1c2 of the second sub-pixel is electrically coupled to the common line;

wherein the first terminal of the storage capacitor Cst2 of the second sub-pixel is electrically coupled to the drain of the transistor T2 of the second sub-pixel; and wherein one of the second terminal of the storage capacitor Cst1 of the first sub-pixel and the second terminal of the storage capacitor Cst2 of the second sub-pixel is electrically coupled to the scanning line $G_{n-1}$ or the scanning line $G_{n+1}$, and the other of the second terminal of the storage capacitor Cst1 of the first sub-pixel and the second terminal of the storage capacitor Cst2 of the second sub-pixel is electrically coupled to the common line.

2. The LCD panel of claim 1, wherein when a plurality of scanning signals is sequentially applied to the plurality of scanning lines $\{G_n\}$, a plurality of data signals is simultaneously applied to the plurality of data lines $\{D_m\}$, and a common signal is applied to the common line, potential differences are generated in the sub-pixel electrodes of the first and second sub-pixels of each pixel, respectively.

3. The LCD panel of claim 2, wherein each of the plurality of scanning signals comprises an electrical signal having a period and at least two potentials, and wherein the at least two potentials contains a high potential and a low potential adapted for respectively turning on and off the transistors T1 and T2 of the first and second sub-pixels of each pixel.

4. The LCD panel of claim 3, wherein at least one of the plurality of scanning signals comprises a modulating signal having at least one potential that is substantially different from the high potential and the low potential of the at least one of the plurality of scanning signals.

5. The LCD panel of claim 4, wherein the at least one potential of the modulating signal is superposed with the at least one of the plurality of scanning signals in time prior to the high potential and/or subsequent to the low potential of the at least one of the plurality of scanning signals.

6. The LCD panel of claim 5, wherein the modulating signal oscillates in time with a modulating period, wherein the modulating period is correlated to the period of the at least one of the plurality of scanning signals.

7. The LCD panel of claim 2, wherein each of the plurality of data signals is decomposed into a number of frames, each frame having a polarity that is opposite to that of its immediately prior and/or next frame.

8. The LCD panel of claim 2, wherein the common signal comprises an electrical signal having a constant potential or alternative potentials oscillating in time with a period.

9. The LCD panel of claim 1, wherein each of the transistors T1 and T2 of the first and second sub-pixels of each pixel is a field-effect thin film transistor (TFT).

10. The LCD panel of claim 1, wherein the storage capacitor Cst1 of the first sub-pixel and the storage capacitor Cst2 of the second sub-pixel are identical or substantially different.

11. A liquid crystal display (LCD) panel, comprising:
  a. a common electrode;
  b. a plurality of scanning lines;
  c. a plurality of data lines; and
  d. a plurality of pixels formed by the plurality of data lines crossing the plurality of scanning lines, each pixel comprising two or more sub-pixels, each of the two or more sub-pixels comprising a sub-pixel electrode, a transistor having a gate, a source and a drain electrically coupled to a corresponding scanning line, a corresponding data line and the sub-pixel electrode, respectively, a liquid crystal (LC) capacitor electrically coupled between the sub-pixel electrode and the common electrode, and a storage capacitor, wherein at least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels each is coupled between its corresponding sub-pixel electrode and the common electrode.

12. The LCD panel of claim 11, wherein when a plurality of scanning signals is sequentially applied to the plurality of scanning lines, a plurality of data signals is simultaneously applied to the plurality of data lines, and a common signal is applied to the common electrode, potential differences are generated in the sub-pixel electrodes of the two or more sub-pixels of each pixel, respectively.

13. The LCD panel of claim 12, wherein each of the plurality of scanning signals comprises an electrical signal having a period and at least two potentials, wherein the at least two potentials contain a high potential and a low potential adapted for respectively turning on and off the transistors of the two or more sub-pixels of each pixel.

14. The LCD panel of claim 13, wherein at least one of the plurality of scanning signals comprises a modulating signal having at least one potential that is substantially different from the high potential and the low potential of the at least one of the plurality of scanning signals.

15. The LCD panel of claim 14, wherein the modulating signal oscillates in time with a modulating period, and wherein the modulating period is correlated to the period of the at least one of the plurality of scanning signals.

16. The LCD panel of claim 12, wherein each of the plurality of data signals is decomposed into a number of frames, each frame having a polarity that is opposite to that of its immediately prior and/or next frame.

17. The LCD panel of claim 12, wherein the common signal comprises an electrical signal having a constant potential or alternative potentials oscillating in time with a period.

18. The LCD panel of claim 11, wherein each of the transistors of the two or more sub-pixels of each pixel is a field-effect thin film transistor (TFT).

19. The LCD panel of claim 11, wherein the storage capacitors of the two or more sub-pixel are identical or substantially different from one another.

20. A method of driving a liquid crystal display (LCD) with color washout improvement, comprising the steps of:
  a. providing an LCD panel comprising:
    (i) a common electrode;
    (ii) a plurality of scanning lines;
    (iii) a plurality of data lines; and
    (iv) a plurality of pixels formed by the plurality of data lines crossing the plurality of scanning lines, each pixel comprising two or more sub-pixels, each of the two or more sub-pixels comprising a sub-pixel electrode, a transistor having a gate, a source and a drain electrically coupled to a corresponding scanning line, a corresponding data line and the sub-pixel electrode, respectively, a liquid crystal (LC) capacitor electrically coupled between the sub-pixel electrode and the common electrode, and a storage capacitor, wherein at least one of the storage capacitors of the two or more sub-pixels is electrically coupled between its corresponding sub-pixel electrode and a scanning line immediately prior or next to the corresponding scanning line, and the rest of the storage capacitors of the two or more sub-pixels each is coupled between its corresponding sub-pixel electrode and the common electrode; and
  b. applying a plurality of driving signals to the LCD panel so as to generate potential differences in the sub-pixel electrodes of the two or more sub-pixels of each pixel, respectively.

21. The method of claim 20, further comprising the step of generating the plurality of driving signals.

22. The method of claim 21, wherein the plurality of driving signals comprises a plurality of scanning signals sequentially applied to the plurality of scanning lines, a plurality of data signals simultaneously applied to the plurality of data lines, and a common signal applied to the common electrode.

23. The method of claim 22, wherein each of the plurality of scanning signals comprises an electrical signal having a period and at least two potentials, and wherein the at least two potentials has a high potential and a low potential adapted for respectively turning on and off the transistors of the two or more sub-pixels of each pixel.

24. The method of claim 23, wherein at least one of the plurality of scanning signals comprises a modulating signal having at least one potential that is substantially different from the high potential and the low potential of the at least one of the plurality of scanning signals.

25. The method of claim 24, wherein the modulating signal oscillates in time with a modulating period, wherein the modulating period is correlated to the period of the at least one of the plurality of scanning signals.

26. The method of claim 22, wherein each of the plurality of data signals is decomposed into a number of frames, each frame having a polarity that is opposite to that of its immediately prior and/or next frame.

27. The method of claim 22, wherein the common signal comprises an electrical signal having a constant potential or alternative potentials changing in time with a period.

* * * * *